United States Patent [19]

Winslow

[11] Patent Number: 4,539,673
[45] Date of Patent: Sep. 3, 1985

[54] OPTICAL DISC AIR SEPARATION METHOD AND DEVICE

[75] Inventor: John S. Winslow, Altadena, Calif.

[73] Assignee: Optical Disc Corporation, Cerritos, Calif.

[21] Appl. No.: 517,470

[22] Filed: Jul. 26, 1983

[51] Int. Cl.³ .................. H04N 5/76; G01D 15/34
[52] U.S. Cl. .................. 369/284; 369/287; 346/135.1; 346/137
[58] Field of Search .................. 346/135.1, 137; 369/284, 287

[56] References Cited

U.S. PATENT DOCUMENTS

| | | | |
|---|---|---|---|
| 4,074,282 | 2/1978 | Balas, Jr. et al. | 346/135 X |
| 4,264,911 | 4/1981 | Wilkinson | 346/135.1 |
| 4,353,767 | 10/1982 | Wilkinson | 156/245 X |
| 4,365,258 | 12/1982 | Geyer et al. | 346/137 X |
| 4,447,899 | 5/1984 | Geyer et al. | 369/111 X |

Primary Examiner—E. A. Goldberg
Assistant Examiner—Gerald E. Preston
Attorney, Agent, or Firm—Steven P. Brown

[57] ABSTRACT

An optical disc structure including two resilient disc members which are bonded together adjacent their outer peripheries and which include an air channel allowing communication between the chamber formed between the discs and the atmosphere. An information layer is formed on the inner surface of at least one of the members. When the members are spun, a pressure differential is caused tending to push the two members apart, thereby assuring that one member will not contact the information layer formed on the other member and that the two members will not be close enough together to cause optical interference.

18 Claims, 4 Drawing Figures

OPTICAL DISC AIR SEPARATION METHOD AND DEVICE

TECHNICAL FIELD

The present inventron relates to the field of optical recording media and methods of manufacturing such media. More particularly, the present invention relates to a novel structure for an optical recording disc of the type formed as a sandwich of two substrates with a recording layer on the inner surface of one or both of the substrates.

BRIEF DESCRIPTION OF THE PRIOR ART

Various structures are known for optical recording discs.

The simplest structures are "open-face" structures with an information layer on one surface of a substrate. Due to the fragile nature of the information layer, and the fact that dust particles and other forms of contamination generally cause errors in writing and reading information on such media, it is usually preferable if not necessary to enclose the information layer between the substrate and a protective layer, forming a "sandwich" structure.

U.S. Pat. No. 4,074,282 discloses such a structure in which a radiation sensitive coating is formed on one surface of a relatively thick substrate disc. A relatively thin protective disc or "window" is then connected to the substrate and held spaced from the substrate by a pair of concentric annular spacers or sealing rings located adjacent the center and outer peripheries, respectively, of the discs. As described, this forms an "air sandwich" structure which assures that the protective window disc will not touch the radiation sensitive coating.

In order to allow internal pressure of the air sandwich structure to adjust to changing atmospheric pressure and to accommodate pressure differentials caused by centrifugal forces acting on the rotating disc, the patent suggests the possibility of forming one or more aperture in the sealing rings.

Unfortunately, the structure disclosed in this patent is relatively bulky and expensive to manufacture.

U.S. Pat. No. 4,264,911 discloses an air sandwich disc structure formed of two identical disc members formed by injection molding or the like. Each of these two disc members includes concentric annular bosses or ridges extending from the inner surface adjacent the center and outer peripheries thereof. These bosses are glued together to connect the discs, and they perform the same function as the spacers of the above-referenced patent.

While this latter structure is easier to assemble, difficulty has been encountered in molding the bosses or ridges to adequate flatness to assure proper bonding of the discs and to prevent distortion of the information layer carrying portion of the disc between the inner and outer ridges.

Accordingly, a need exists for a structure which is simple to manufacture and assemble and which assures reliable and distortion free bonding of the discs.

BRIEF SUMMARY OF THE PRESENT INVENTION

It is therefore an object of the present invention to provide an optical disc structure of the "air sandwich" type which is readily manufactured and assembled with reliable optical and mechanical properties.

It is a further object of the present invention to provide an inexpensive method of manufacturing such discs.

It is a specific object of the present invention to provide an air sandwich optical disc structure which positively prevents contact between an information layer and an overlying window or additional substrate during use, but which does not require spacer rings or deep molded ridges.

In its broadest aspect, the present invention fulfills the above objects by providing an optical disc structure which takes advantage of the significant aerodynamic forces present when the disc is in use.

As is known, a spinning disc slings air radially outward in the plane of the disc. This air is replaced by "makeup" air drawn axially toward the center of the disc. If two discs are spun close together on the same hub, the radial movement of the air from between the discs will produce a reduced pressure between the discs unless makeup air is supplied between the discs. The reduced pressure between the discs results in a pressure differential and a net force pushing the discs together.

On the other hand, if the discs are hermetically sealed together adjacent their outer peripheries to define an air chamber between the discs which is vented only adjacent the centers of the discs, a pressure differential results tending to increase the spacing between the discs.

If air is admitted through a vent at atmospheric pressure $P_o$ at a radius $R_o$, the centrifugal acceleration of the trapped air will produce a static pressure P at a radius R greater than $R_o$ defined by the equation:
$P = P_o + \rho\omega^2 (R^2 - R_o^2)/2$
where $\rho$ is the density of atmosphere and $\omega$ is the angular velocity. For example, a pair of twelve inch in diameter discs sealed together at their outer peripheries and vented adjacent their centers would show a static pressure rise of 0.03045 psi at a four inch radius when spun at 1800 rpm. The total force pushing the discs apart would be 3.7 pounds and could be employed to separate the members.

Accordingly, the disc structure of the present invention includes two resilient disc members which are bonded together and hermetically sealed adjacent their outer perpheries and which include an air channel allowing communication between the chamber formed between the discs and the atmosphere.

With relatively thin and flexible discs, if the outer edges of the discs are bonded in such a way as to allow a hinge-like flexing at the edges of the discs, it is possible that the discs will separate by several millimeters under the pressure induced by high rotational speeds. However, the amount of separation of discs can be somewhat limited by mechanically constraining the outer portions of the discs to remain parallel to one another. This can be accomplished simply by rigidly bonding the two discs together over a small annular area adjacent the outer peripheries of the discs. An area having a width at least twice the thickness of one of the members is preferred.

This bonding can be done by solvent welding, sonic welding, or by using various glues which are not inclined to creep or stretch significantly under load.

Since the writing and reading processes are performed optically, it is necessary that the optical characteristics of the medium be very consistent. If the recording is accomplished by shining light through one of the members (a "window") and focussing it onto an information layer on the other member, the window member must be spaced sufficiently far from the information layer to prevent optical interference due to slight surface irregularities or variations in spacing caused by ripples in the window.

Even if the information layer is formed on the inner surface of the window, it is important to maintain adequate separation to prevent interference by light transmitted through the layer and reflected by the other member.

It has been found that two flat discs can be bonded together at their outer peripheries in the above described manner so that while the information layers on the inner surfaces thereof are in intimate contact when the discs are stationary, they will be adequately separated to allow recording on one of the layers without interference by the other member when the disc is spinning at a normal rotational rate.

If desired for structural reasons, the discs may be bonded together adjacent their centers, provided an adequate air channel is formed which allows sufficient air to pass into the chamber between the discs to separate them in a relatively short period of time. This can be done by leaving one or more unglued passages extending from central holes through the discs to the air chamber, or by forming one or more axial holes in the disc immediately radially outside of the central bonding area.

In accordance with an another aspect of the present invention, a spacer may be placed between the centers of the two discs. This spacer may be bonded to only one of the discs, in which case the air channel is defined between the spacer and the other discs, or the spacer may include one or more grooves in the spacer which define an air channel.

The spacer will prevent contact between an information layer and an overlaying information layer or disc member when the discs are stationary. This is necessary with certain relatively soft or fragile information layers that would be damaged by any contact. The central spacer need only be thick enough to prevent actual contact with the information layer, and the pressure effects described above can be relied on to provide additional spacing during use to prevent optical interference during the writing or reading processes.

An extremely shallow upraised ridge may be provided adjacent the outer periphery of one or both of the disc members to facilitate sonic welding of the members or to facilitate the application of solvent or glue during the assembly process. The shallowness of such a ridge overcomes the molding difficulties inherent in the deeper ridges of the prior art.

Other aspects and advantages of the present invention will become apparent from the following description of the preferred embodiment, taken in conjunction with the accompanying drawings, which disclose, by way of example, the principles of the invention.

DETAILED DESCRIPTION OF THE PREFERRED EMBODIMENT

Figure 1:
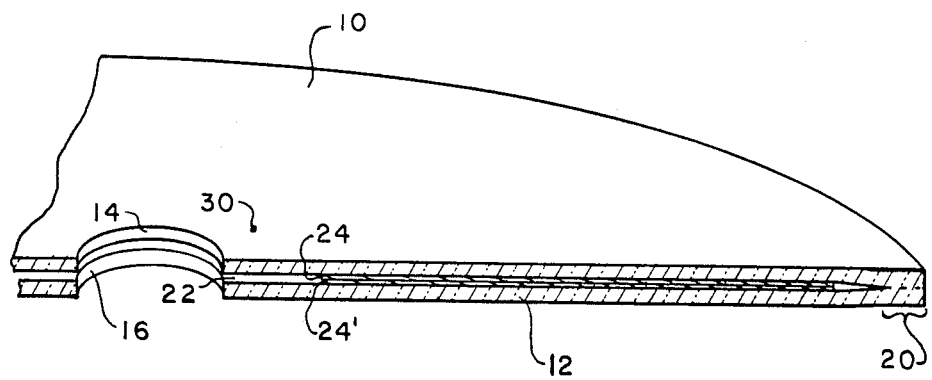
FIG. 1 is a partial sectional view of a portion of a disc-shaped optical recording medium in accordance with the present invention, the medium having two light-sensitive recording layers therein.

As shown in FIG. 1, the optical information medium of the present invention is preferrably formed by two disc-shaped members 10 and 12. For mounting purposes, each of these members may include a central hole 14 and 16, respectively.

The two members 10 and 12 are bonded together over an annular area 20 adjacent their outer peripheries. This bonding can be accomplished by applying a solvent or glue over the area 20 on one or both of the members and subsequently pressing the discs together in an annular clamp, or by placing both of the members in a sonic welding jig which applies concentrated sonic energy to the area 20, in accordance with known techniques.

One or both of the members 10 and 12 include an information layer 24 and 24'. The information layer may be a thin layer of low melting point metal, or a layer of light absorbing organic material such a dye, as is readily known in the art.

Figure 2:
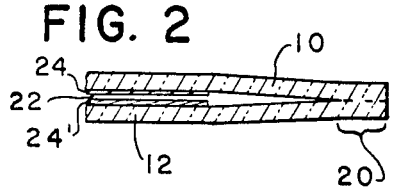
FIG. 2 is a cross sectional view of the outer peripheral portion of the disc of FIG. 1 as distorted by aerodynamic forces.

As shown in FIG. 2, when the disc of FIG. 1 is spun at normal operating speeds such as 900 to 1800 rpm, the disc members 10 and 12 will be distorted, thereby widening the space between the members.

The spacing between the members will be limited by the fact that the members are mechanically constrained parallel to one another over the bonding area 20. Because of this mechanical constraint, any separation of the disc members results in a bending of the members adjacent the area 20. Due to the resilient nature of the members 10 and 12, any distortion of the members results in resilient forces tending to restore the members to their normal flat shape. The amount of separation between the disc members is therefore determined by the balancing of these inwardly directed resilient forces with the outwardly directed forces resulting from increased air pressure between the members.

Naturally, in order to prevent a gradual separation of the members at the area 20 as a result of continued rotation of the discs at high speed, it is necessary that the members be bonded together rigidly. Solvent welds or sonic welds achieve a bond which is as strong as the parent material. Accordingly, such bonds are preferred when the material forming the members allows such bonding. Various glues are also available which provide relatively strong and rigid bonds. One class of such glues are cyanoacrylate glues. Other glues can be used provided they do not plastically deform or creep under continued stress.

In order to assure proper bonding over the area 20, it is essential that the recording layers 24 and 24' not be formed over the area 20. Alternatively, a separate step may be employed to remove the information layer from the bonding area 20 prior to assembling the disc members.

Although not shown, in certain circumstances, it may be preferred to also bond the disc members 10 and 12 together adjacent their centers. This can be done in a similar manner to the bonding accomplished at the area 20. However, care must be taken to leave an air channel which communicates between the air chamber 22 and the atmosphere. This air channel can take the form of an unbonded area extending radially from the central hole 14 or 16 to the air chamber 22. Alternatively, the air channel can be formed by one or more axial hole 30 adjacent the inner boundary of the air chamber 22.

Figure 3:
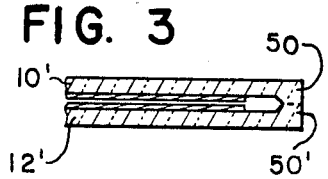
FIG. 3 is a partial cross sectional view of a second embodiment of the present invention including a central spacer.

FIG. 3 shows an alternate embodiment of the optical information medium of the present invention which includes a spacer 40 between the disc members 10 and 12 adjacent their centers. The use of such a spacer prevents contact between an information layer on one member and the inner surface of the other member or information layer. The spacer 40 can be formed by molded ridges on the inner surface of the members 10 and 12, or by a separate member as shown in the FIGURE.

The spacer 40 can be bonded to one or both of the disc members 10 and 12. The spacer 40 can include one or more grooves 46 which define an air channel providing communication between the air chamber 22 and the atmosphere.

Figure 4:
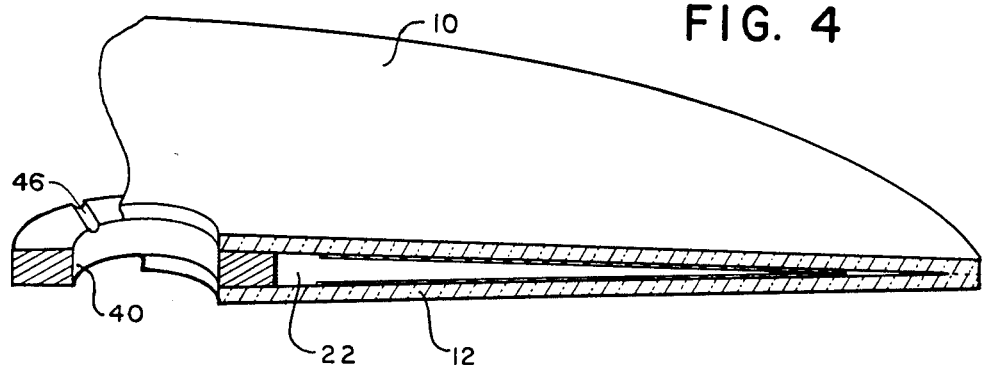
FIG. 4 is a cross sectional view of the outer periphery of a further embodiment in which the members include shallow upraised ridges adjacent the outer peripheries.

As shown in FIG. 4, shallow upraised ridges 50 and 50' can be formed on the disc members 10' and 12' for convenience in applying the solvent or glue or to aid in concentrating the forces used for sonic welding. It is merely necessary for the ridges 50 and 50' to be thicker than the information layers 24 and 24'. Since such information layers are typically less than a micron in thickness, the ridges 50 and 50' can be easily formed in one or both of the disc members. If the members are to be sonicly welded together, it is necessary for at least one of the ridges to be substantially triangular in cross-section to concentrate the sonic energy.

In order to assemble the information medium of the present invention, the two disc members are first formed by any convenient means, such as by injection molding. One or more of the finished and clean disc members is then coated with an information layer in accordance with known techniques. If the information layer is spin coated, it may be necessary to remove a portion of the layer adjacent the outer periphery of the member.

If the members are to be sonically welded together, they are simply aligned and placed together in a welding jig which exerts pressure over the annular area 20 while simultaneously concentrating sonic energy over that area to heat the area of contact and fuse the two members together.

Alternatively, a solvent or glue may be applied to the area 20 of one or both of the members such as by spinning the member and applying a measured amount of solvent or glue with a stationary hypodermic syringe or the like. The two members are then aligned and clamped together using an annular clamp which forces the areas 20 of the two members into intimate contact, assuring a strong and ripple free bond.

Naturally, if the disc members are also to be bonded together adjacent their centers, this can be done simultaneously with the bonding over the area 20. Additionally, if a separate spacer member is to be a part of the structure, it can first be bonded to one of the members and then bonded or not bonded, as desired, to the second member when the two members are assembled.

It will be appreciated from the foregoing description that the present invention provides an improved optical information medium structure and a convenient method for manufacturing that structure. Although the invention has been described in detail with reference to a few preferred embodiments, it will be understood by one of ordinary skill in the art that various modifications can be made, without departing from the spirit and scope of the invention. Accordingly, it is not intended that the invention be limited except by the appended claims.

I claim:

1. An optical information medium, comprising:
   first and second resilient disc-shaped members,
     said members being substantially rigidly bonded together adjacent their outer peripheries and substantially hermetically sealed adjacent their outer peripheries,
     said member defining at least one air channel adjacent the center thereof,
     said at least one air channel providing communication between the atmosphere and an unbonded region between said members, said air channel being sufficiently large to allow substantially instantaneous expansion of the spacing between said members over said unbonded area upon spinning of said medium about its central axis,
     at least one of said members being at least partially transparent to light.

2. An optical information medium as claimed in claim 1, wherein:
   at least one of said members includes an annular information layer on an inner surface thereof; and
   said unbonded region includes at least the area of said annular information layer.

3. An optical information medium as claimed in claim 2, wherein:
   said first and second members are bonded together over an annular bonding area adjacent the outer periphery of said members, and
   said annular information layer is radially spaced from said annular bonding area.

4. An optical information medium as claimed in claim 3, wherein said annular bonding area is at least twice as wide as each of said members are thick.

5. An optical information medium as claimed in claim 3, wherein when said members are stationary, at least a portion of said annular information layer is in contact with both said members.

6. An optical information medium as claimed in claim 3, wherein at least one of said first and second members includes an annular upraised ridge on the inner surface thereof coextensive with said bonding area.

7. An optical information medium as claimed in claim 6, wherein said first and second members are identical to one another and each of said members includes an annular upraised ridge.

8. An optical information medium as claimed in claim 1, wherein each of said first and second members includes a central hole therethrough and said at least one air channel includes at least one unbonded area between said two members and communicating with said central holes.

9. An optical information medium as claimed in claim 8, further comprising a spacer between said members adjacent the inner periphery thereof, said spacer being bonded to at least one of said members.

10. An optical information medium as claimed in claim 9, wherein the thickness of said spacer is chosen such that said information layer contacts only the member on which it is formed.

11. An optical information medium as claimed in claim 9, wherein at least a portion of said spacer is formed by an annular ridge on the inner surface of at least one of said members.

12. An optical information medium as claimed in claim 8, wherein said spacer includes at least one radial groove forming said air channel.

13. An optical information medium as claimed in claim 1, wherein said members are sealed adjacent the centers thereof and said at least one air channel includes at least one axial hole through at least one of said members communicating with said unbonded region.

14. A method of forming an optical information storage member, comprising the steps of:
forming two disc-shaped members;
coating an inner surface of at least one of said members with an information layer; and
bonding the two members together such that:
the outer peripheries of the two members are mechanically constrained to remain parallel;
the two members are unbonded over an annular information region; and
an air channel is present adjacent the center of the members which allows communication between the atmosphere and the information region; and
rotating the bonded members about their central axes, such that the members are pulled slightly apart over the information region.

15. The method as claimed in claim 14, wherein said bonding step includes the steps of:
applying a solvent to an annular bonding area adjacent the outer periphery of at least one of the members; and
clamping the members together over the bonding area.

16. The method as claimed in claim 15, wherein said bonding step further includes:
applying a solvent to an inner bonding area adjacent the center of at least one of the members; clamping the members together over the inner bonding area; and forming at least one air channel adjacent the outer boundary of the inner bonding area.

17. The method as claimed in claim 14, wherein said forming step includes forming an upraised ridge on the inner surface of at least one of said members, adjacent the outer periphery thereof.

18. The method as claimed in claim 14, further comprising the step of providing a spacer between the two members adjacent the centers thereof.

* * * * *